(12) United States Patent
Hetzler et al.

(10) Patent No.: US 7,899,881 B2
(45) Date of Patent: *Mar. 1, 2011

(54) MULTIPATH DATA RETRIEVAL FROM REDUNDANT ARRAY

(75) Inventors: Steven Robert Hetzler, Los Altos, CA (US); Daniel Felix Smith, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 482 days.

This patent is subject to a terminal disclaimer.

(21) Appl. No.: 12/016,597

(22) Filed: Jan. 18, 2008

(65) Prior Publication Data

US 2008/0114934 A1    May 15, 2008

Related U.S. Application Data

(63) Continuation of application No. 10/619,633, filed on Jul. 14, 2003, now Pat. No. 7,379,974.

(51) Int. Cl.
G06F 17/00 (2006.01)
(52) U.S. Cl. ......... 709/217; 709/223; 709/224; 709/225; 714/22; 714/42; 711/114; 711/112
(58) Field of Classification Search .................. 709/217, 709/215, 225, 223, 224
See application file for complete search history.

(56) References Cited

U.S. PATENT DOCUMENTS

| | | |
|---|---|---|
| 5,134,619 A | 7/1992 | Henson et al. |
| 5,148,432 A | 9/1992 | Gordon et al. |
| 5,257,391 A | 10/1993 | DuLac et al. |
| 5,301,297 A | 4/1994 | Menon et al. |
| 5,398,253 A | 3/1995 | Gordon |
| 5,506,977 A | 4/1996 | Jones |
| 5,579,475 A | 11/1996 | Blaum et al. |
| 5,592,612 A | 1/1997 | Birk |
| 5,758,054 A | 5/1998 | Katz et al. |
| 5,835,938 A | 11/1998 | Yamamoto et al. |
| 5,848,229 A | 12/1998 | Morita |
| 5,937,428 A | 8/1999 | Jantz |

(Continued)

FOREIGN PATENT DOCUMENTS

JP    PUPA 06-282385    10/1994

(Continued)

OTHER PUBLICATIONS

G.A. Alvarez et al., Tolerating Multiple Failures in RAID Architectures with Optimal Storage and Uniform Declustering, Computer Architecture News (USA), V. 25, #2, pp. 62-72, May 1972.

(Continued)

Primary Examiner — Jude J Jean Gilles
(74) Attorney, Agent, or Firm — Joseph Curtin; Mohammed Kashef

(57) ABSTRACT

An optimum pathway to data stored on a data storage system having N storage devices and more than N pathways is determined in response to a read request for the data. A sorter separates the read request into an appropriate segment size for sending to the storage devices of the data storage system. An assigner generates the set of read permutations satisfying the read request. A read permutation is selected based on a metric. A collector receives the requested data from the N storage devices in response to the selected read permutation being sent to the storage devices.

1 Claim, 5 Drawing Sheets

U.S. PATENT DOCUMENTS

| | | | |
|---|---|---|---|
| 6,070,249 | A | 5/2000 | Lee |
| 6,138,125 | A | 10/2000 | DeMoss |
| 6,154,853 | A | 11/2000 | Kedem |
| 6,161,165 | A | 12/2000 | Solomon et al. |
| 6,269,453 | B1 | 7/2001 | Krantz |
| 6,275,898 | B1 | 8/2001 | DeKoning |
| 6,279,138 | B1 | 8/2001 | Jadav et al. |
| 6,321,345 | B1 | 11/2001 | Mann et al. |
| 6,353,895 | B1 | 3/2002 | Stephenson |
| 6,356,977 | B2 | 3/2002 | Ofek et al. |
| 6,430,118 | B1 * | 8/2002 | Anderson .................. 369/30.1 |
| 6,434,637 | B1 | 8/2002 | D'Errico |
| 6,530,004 | B1 | 3/2003 | King et al. |
| 6,629,204 | B2 | 9/2003 | Tanaka et al. |
| 7,017,107 | B2 | 3/2006 | Talagala et al. |
| 7,020,394 | B2 | 3/2006 | Zhang et al. |
| 7,062,704 | B2 | 6/2006 | Talagala et al. |
| 7,254,754 | B2 | 8/2007 | Hetzler et al. |
| 7,281,177 | B2 | 10/2007 | Hetzler et al. |
| 7,379,974 | B2 * | 5/2008 | Hetzler et al. ................ 709/217 |
| 7,562,163 | B2 * | 7/2009 | Cashman et al. ............... 710/16 |
| 2002/0035667 | A1 | 3/2002 | Bruning, III et al. |
| 2002/0107962 | A1 | 8/2002 | Richter et al. |
| 2002/0162075 | A1 | 10/2002 | Talagala et al. |
| 2003/0035166 | A1 | 2/2003 | Zhang et al. |
| 2005/0015371 | A1 * | 1/2005 | Hetzler et al. ................... 707/7 |
| 2008/0195811 | A1 | 8/2008 | Hetzler et al. |

FOREIGN PATENT DOCUMENTS

| | | | |
|---|---|---|---|
| WO | WO 00/67250 | A2 | 11/2000 |

OTHER PUBLICATIONS

V. Bohossian et al., Computing in the RAIN: A Reliable Array of Independent Nodes, pp. 1-20, Sep. 24, 1999.

P.M. Chen et al., RAID: High-Performance, Reliable Secondary Storage, ACM Computing Surveys, vol. 26, No. 2, pp. 146-185, Jun. 1994.

M. Holland et al., Parity Declustering for Continuous Operation in Redundant Disk Arrays, ACM 0-89791-535-6/92/0010/0023, pp. 23-35, Oct. 1992.

N.K. Ouchi, Two-Level DASD Failure Recovery Method, IBM Technical Disclosure Bulletin, vol. 36, No. 03, pp. 187-190, Mar. 1993.

D.A. Patterson et al., A Case for Redundant Arrays of Inexpensive Disks (RAID), ACM 0-89791-268-3/88/0006/0109 1998.

J.S. Plank, A Tutorial on Reed-Solomon Coding for Fault-Tolerance in RAID-like Systems, pp. 1-19, Feb. 19, 1999.

E.J. Schwabe et al., Evaluating Approximately Balanced Parity-Declustered Data Layouts for Disk Arrays, ACM 0-89791-813-4/96/05, pp. 41-54, 1996.

E.J. Schwabe et al., Flexible Usage of Parity Storage Space in Disk Arrays, ACM 0-89791-809-6/96/06, pp. 99-108, 1996.

L. Xu et al., X-Code: MDS Array Codes with Optimal Encoding, IEEE Trans. On Information Theory, vol. 45, No. 1, pp. 272-276, Jan. 1999.

M. Blaum et al., "MDS Array Codes with Independent Parity Symbols," IEEE Trans. on Information Theory, vol. IT-42, pp. 529 542, Mar. 1996.

M. Blaum et al., "The EVENODD Code and its Generalization," High Performance Mass Storage and Parallel I/O: Technologies and Applications,' edited by H. Jin et al., IEEE & Wiley Press, New York, Chapter 14, pp. 187 208, 2001.

M. Blaum et al., "EVENODD: An Efficient Scheme For Tolerating Double Disk Failures In A RAID Architecture," IEEE Trans. on Computers, vol. 44, No. 2, pp. 192-202, Feb. 1995.

Office Action in EP 04 741 962.7-1245 mailed Jul. 11, 2007, 6 pages.

* cited by examiner

MULTIPATH DATA RETRIEVAL FROM REDUNDANT ARRAY

CROSS-REFERENCE TO RELATED APPLICATIONS

The present application is a continuation patent application of U.S. patent application Ser. No. 10/619,633, filed Jul. 14, 2003 now U.S. Pat. No. 7,379,974, invented by Steven J. Hetzler et al., entitled "Multipath Data Retrieval From Redundant Array, the disclosure of which is incorporated by reference herein and is a parent of U.S. patent application Ser. No. 12/016,597, invented by Steven J. Hetzler et al., filed Mar. 20, 2008, entitled "Multipath Data Retrieval From Redundant Array," which is a continuation patent application of the present patent application. Additionally, the present application is related to patent application Ser. No. 10/619,641, entitled "Anamorphic Codes", patent application Ser. No. 10/619,649, entitled "Autonomic Parity Exchange," now U.S. Pat. No. 7,281,177 B2 to Hetzler et al., issued Oct. 9, 2007, and patent application Ser. No. 10/619,648, entitled "RAID 3+3," now U.S. Pat. No. 7,254,754 B2 to Hetzler et al., issued Aug. 7, 2007, each co-pending, co-assigned and each filed Jul. 14, 2003, and the disclosure of each incorporated by reference herein. The present application is also related to co-assigned patent application Ser. No. 10/600,593, which has been announced to be U.S. Pat. No. 7,350,126 to Winograd et al. on Mar. 25, 2008, the disclosure of which is also incorporated by reference herein.

BACKGROUND

1. Field

The subject matter disclosed herein relates to the field of data storage systems. In particular, the subject matter disclosed herein relates a system and a method for determining a best pathway to requested data based on a metric, thereby improving device failure protection of an array of storage devices.

2. Description of the Related Art

A conventional array of storage devices typically has sufficient redundancy so that when a storage device fails, information contained in the failed storage device can be reconstructed from the remaining storage devices. See, for example, U.S. Pat. No. 5,579,475 to M. M. Blaum et al., entitled "Method and Means for Encoding and Rebuilding the Data Contents of Up to Two Unavailable DASDs in a DASD Array Using Simple Non-Recursive Diagonal and Row-Parity," which discloses the operation of an array having distance D=3. See also, N. K. Ouchi, "Two-Level DASD Failure Recovery Method," IBM Technical Disclosure Bulletin Vol. 36, 03 Mar. 1993, discloses the operation required for reconstructing data from an array with failures and having distance D=3.

Redundancy may also be used for improving performance. See, for example, E. J Schwabe et al., "Evaluating Approximately Balanced Parity-Declustered Data Layouts for Disk Arrays," ACM 0-89791-813-4/96/05 1996, which disclose data layouts for efficient positioning of redundant information for performance. See also G. A. Alvarez et al., who, in "Tolerating Multiple Failures in RAID Architectures," ACM 0-89791-901-7/97/0006 1997, disclose properties and construction of a general multiple-parity array using 8-bit finite fields, and L. Xu and J. Bruck, who, in "Improving the Performance of Data Servers Using Array Codes," Paradise ETR027 (CalTech) 1998, describe the use of a maximum distance separation (MDS) code for improving system response.

Existing RAID (Redundant Array of Independent Disks) systems have multiple pathways, or routes, for reading requested data. Often, however, there are only a few available pathways, of which only one pathway is efficient. For example, a RAID 5 system provides two pathways for reading information. One pathway is by directly reading the sector containing the requested information. The second pathway is by reconstructing the data sector containing the requested information by reading the appropriate sector from each other storage unit in the RAID 5 array. As another example, an N storage unit array that is configured as a RAID 6 system can read a data sector directly or can read all other storage units, except one. Accordingly, there are N ways for RAID 6 to read a data sector. In both instances, there is one efficient pathway and one or more inefficient pathways.

Thus, when there are many pathways for obtaining requested data, for example, more pathways than the number of storage devices in the array, it is not trivially clear which pathway provides in the highest performance for a storage system. Consequently, what are needed are a system and a method for determining which pathway to select when a storage system uses a redundancy method having many pathways to requested data.

BRIEF SUMMARY

The subject matter disclosed herein provides a system and a method for determining which pathway to select when a storage system uses a redundancy method having many pathways to requested data.

The advantages of the subject matter disclosed herein are provided by a pathway determination system for a data storage system having N storage devices and more than N pathways for retrieving requested data from the data storage system. The subject matter disclosed herein also permits at least one of the storage devices to be a failed storage device. The pathway determination system includes a sorter, an assigner and a collector. The sorter receives a read request and separates the read request into an appropriate segment size for sending to the storage devices of the data storage system. The assigner includes a permutation generator that generates a set of read permutations satisfying the read request, and a cost calculator that calculates an expense of each permutation based on a metric calculated from performance information received from the storage devices of the storage system. The read permutations can be generated after the read request is received. Alternatively, the read permutations can be precalculated before a read request is received, based on the architecture of the storage system. The cost calculator uses queue length information and estimated current cost information to assign a value based on a metric to the read permutations. Additional information on the costs are passed back to the permutation generator as hints for the permutation generator to reduce the number of permutations it generates. The assigner selects a read permutation from the set of read permutations. The selection of read permutation is based on the value that the cost calculator assigned it. The metric used by the cost calculator is based on the anticipated resource use of the permutation, such as on a current workload balance for the storage devices of the data system, an estimated delay before the requested data can be retrieved from the storage devices of the storage system, a number of outstanding requests in the queue of a storage device of the storage system, and/or a total queue for all outstanding requests that have been received by the storage system. The assigner sends the selected read permutation to the storage devices of the storage system. The collector receives the requested data from the N storage devices in response to the selected read permutation being sent to the storage devices. The metric can be dynamically changed based on a change in operating conditions of the storage system. Alternatively, the metric can be periodically changed based on operating conditions of the storage system.

The subject matter disclosed herein also provides a method for determining a pathway for obtaining data stored in a data storage system having N storage devices and more than N pathways for retrieving requested data from the data storage system. The storage system can include at least one failed storage device. According to the subject matter disclosed herein, a read request is received and separated into an appropriate segment and size for sending to the storage devices of the data storage system. A set of read permutations satisfying the received read request are generated either at the time the read request is received or in advance. A read permutation is selected from a set of read permutations based on a metric. The metric can be based on a current workload balance for the storage devices of the data system, an estimated delay before the requested data can be retrieved from the storage devices of the storage system, a number of outstanding requests in the queue of a storage device of the storage system, and/or a total queue for all outstanding requests that have been received by the storage system. An expense for each permutation is calculated based on the metric and based on performance information received from the storage devices of the storage system. Queue length information and estimated current cost information is generated and used for generating a reduced number of read permutations based on the queue length information and the estimated current cost information. The selected read permutation is sent to the storage devices of the storage system. The requested data is received from the N storage devices in response to the selected read permutation being sent to the storage devices, and the satisfied read request is returned to the requester. The metric can be dynamically changed based on a change in operating conditions of the storage system. Alternatively, the metric can be periodically changed based on operating conditions of the storage system.

BRIEF DESCRIPTION OF THE DRAWINGS

The subject matter disclosed herein is illustrated by way of example and not by limitation in the accompanying figures in which like reference numerals indicate similar elements and in which.

DETAILED DESCRIPTION

The techniques of the subject matter disclosed herein are applicable to a RAID-type system in which there are more than N pathways for returning a requested data sector, such that N is the number of storage devices in the system. Arbitrary read requests received from a host system are separated into appropriate segments and sizes for dispatch to the data storage devices of the system. The various pathways to the requested data are evaluated and the best permutation of the read request is selected and issued to the storage device array. After the selected permuted read has been gathered, the requested information is determined and returned to the host controller.

The best pathway to the requested data is determined based on a metric, such as the current workload balance for the storage devices in the system, an estimated delay before the requested data can be retrieved, the number of outstanding requests in the queue of a storage device, and/or the total queue for all outstanding requests that have been accepted. The metric may be predetermined or can be continually reevaluated and dynamically changed, such as by retroactively altering the queues of the storage devices of the system, so that the best pathway is selected as circumstances and operating conditions change. When one or more storage devices in the system are unavailable, the subject matter disclosed herein selects the best pathway from the remaining available pathways for obtaining requested data. Information regarding the metrics that are used for selecting the best pathway can be made available externally to the storage system for evaluation by a maintenance entity.

Figure 1:
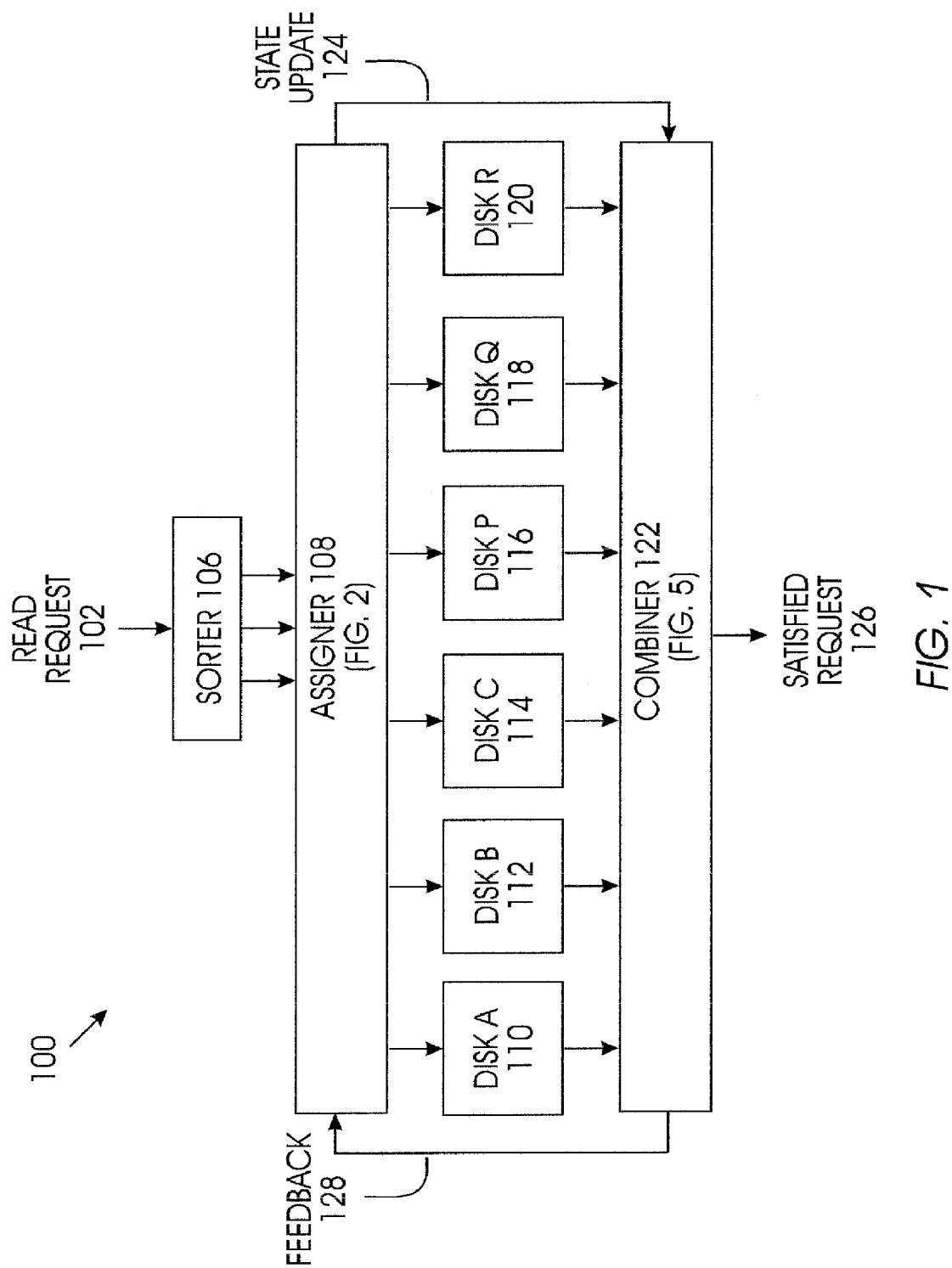
FIG. 1 shows a functional block diagram of an exemplary embodiment of a system for determining the best pathway for obtaining requested data based on a defined metric according to the subject matter disclosed herein.

FIG. 1 shows a functional block diagram of an exemplary embodiment of a system 100 for determining the best pathway for obtaining requested data based on a defined metric according to the subject matter disclosed herein. System 100 is contained within a storage system (not shown) using a 3 data+3 parity MDS (maximum distance separation) erasure code. A primary aspect of a storage system is to process read requests from a host controller (not shown), dispatch the commands to the storage devices of the system, and then return the retrieved data to the host controller. A 3+3 MDS erasure code configuration allows three disk failures without loss of data; while providing that data from any sector on a data disk can be reconstructed by combining the data contained in the appropriate sector from any three of the other disks. Accordingly, the subject matter disclosed herein can be adapted to suit other redundancy schemes, such as RAID 51, other product codes and larger MDS codes.

System 100 includes a sorter 106, an assigner 108, an array of storage devices 110-120, and a combiner 122. Storage devices 110-120 will also be respectively referred to herein as disks A, B, C, which contain data, and P, Q and R, which contain parity information. While storage devices 110-120 are illustratively shown in FIG. 1 as disk drives A, B, C, P, Q and R, respectively, other mass storage devices, such as Random Access Memory (RAM) storage devices, optical storage device, and tape storage devices, can be used as storage devices 110-120.

A read request 102 that is received from the storage system (not shown), in which system 100 is contained, is passed to sorter 106. Sorter 106 sorts each read request 102 in a well-known manner into a Segment (that is, a region of the array of storage devices 110-120 corresponding to the block address of the requested data), an Offset within the segment, a Length, and a Disk (i.e., data disk A, B or C), collectively referred to herein by the acronym SOLD. Each SOLD is then passed from sorter 106 to assigner 108. Assigner 108 selects the best pathway to the data identified by the SOLD. Assigner 108 also passes a determination for satisfying a SOLD to combiner 122 as a state update information 124. Combiner 122 reconstructs the data identified by the SOLD from the results received from storage devices 110-120, and a satisfied request 126 is passed back to the storage system that is external to system 100. Combiner 122 also provides feedback information 128 to assigner 108.

Figure 2:
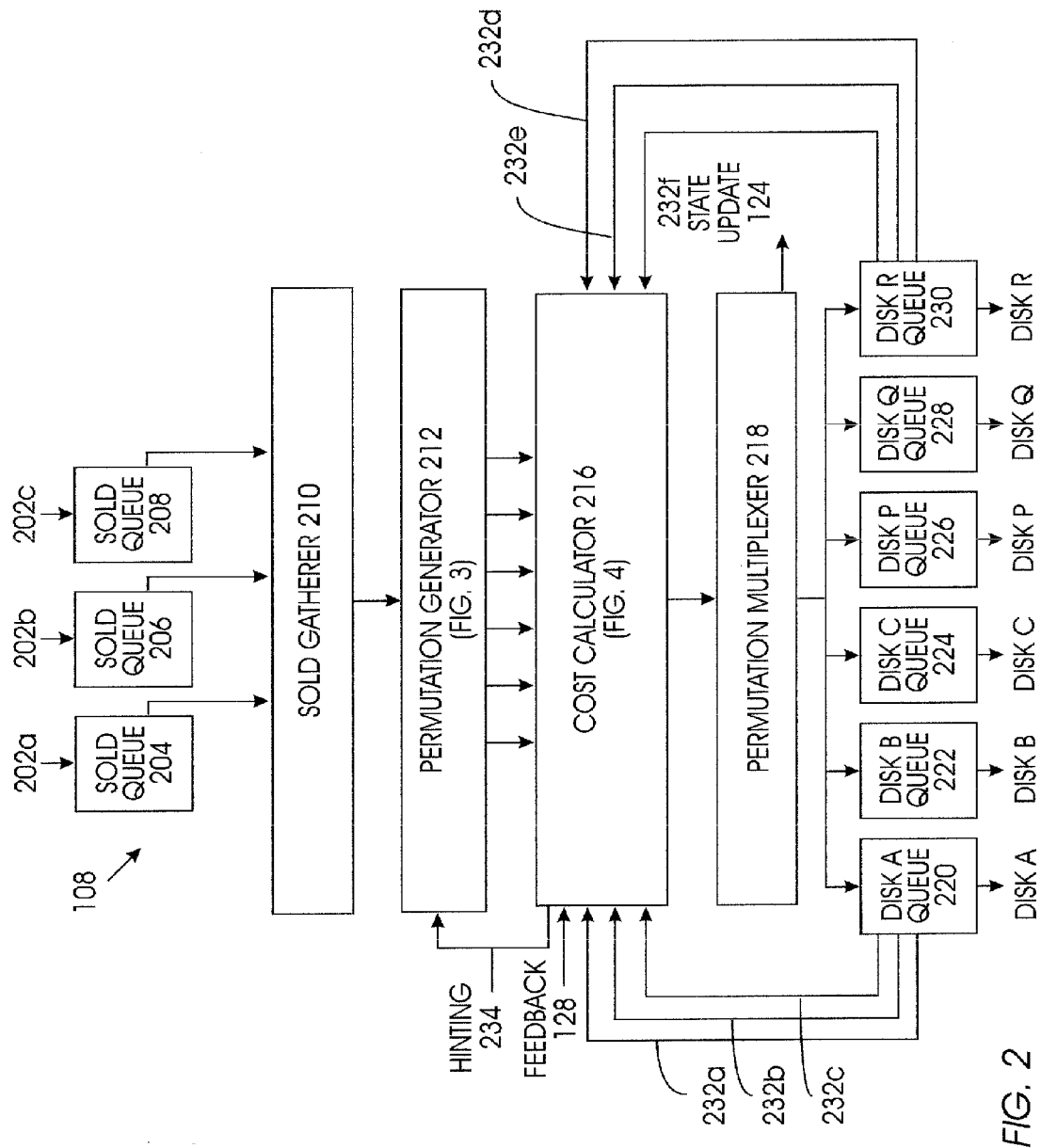
FIG. 2 is a functional block diagram showing greater detail of an assigner, shown in FIG. 1, according to the subject matter disclosed herein.

FIG. 2 is a functional block diagram showing greater detail of assigner 108, shown in FIG. 1. Assigner 108 includes SOLD queues 204-208 for the data disks, a SOLD gatherer 210, a permutation generator 212, a cost calculator 216, a permutation multiplexer 218 and storage device queues 220-230. Storage device requests 202a-202c for data disks A, B and C that are received from sorter 106 (FIG. 1) respectively enter random-access SOLD queues 204-208. SOLD queues 204-208 are configured as well-known I/O queues, and may combine known Quality-of-Service (QoS) features, such as windowing and elevator sorting. SOLDs that are within the same segment are removed from queues 204-208 by a SOLD gatherer 210, which then combines the removed SOLD to form a map of requests for storage devices 110, 112 and 114 (i.e., disks A, B and C) within that segment. The combined SOLDs that are within the same segment are referred to herein as a "SOLD triple". A permutation generator 212 examines each SOLD triple and generates the allowed permutations for each received read request that satisfies the SOLD triple. The generated permutations are passed to a cost calculator 216 that determines the expense of each permutation based on a defined metric. The least expensive permutation is selected by permutation multiplexer 218 based on the defined metric. The selected permutation is passed to queues 220-230 for the storage devices 110-120, respectively. State update information 124 about the selected permutation is passed forward from permutation multiplexer 218 to combiner 122 (FIG. 1). Information 232a-232f relating respectively to queue lengths and estimated current costs of queues 220-230 are passed back from storage device queues 220-230 to cost calculator 216. The cost of a queue is the amount that the cost metric is increased by placing the chosen request on that queue (one of its relationships is to the length of the queue). Additionally, queue length and estimated current cost information 232 is filtered by cost calculator 216 and passed to permutation generator 212 as hinting information 234. Hinting information 234 is used by permutation generator 212 to reduce the number of permutations that must be supplied. Performance information from storage devices 110-120 (FIG. 1) is supplied as feedback information 128 to cost calculator 216 for refining the costing analysis.

Figure 3:
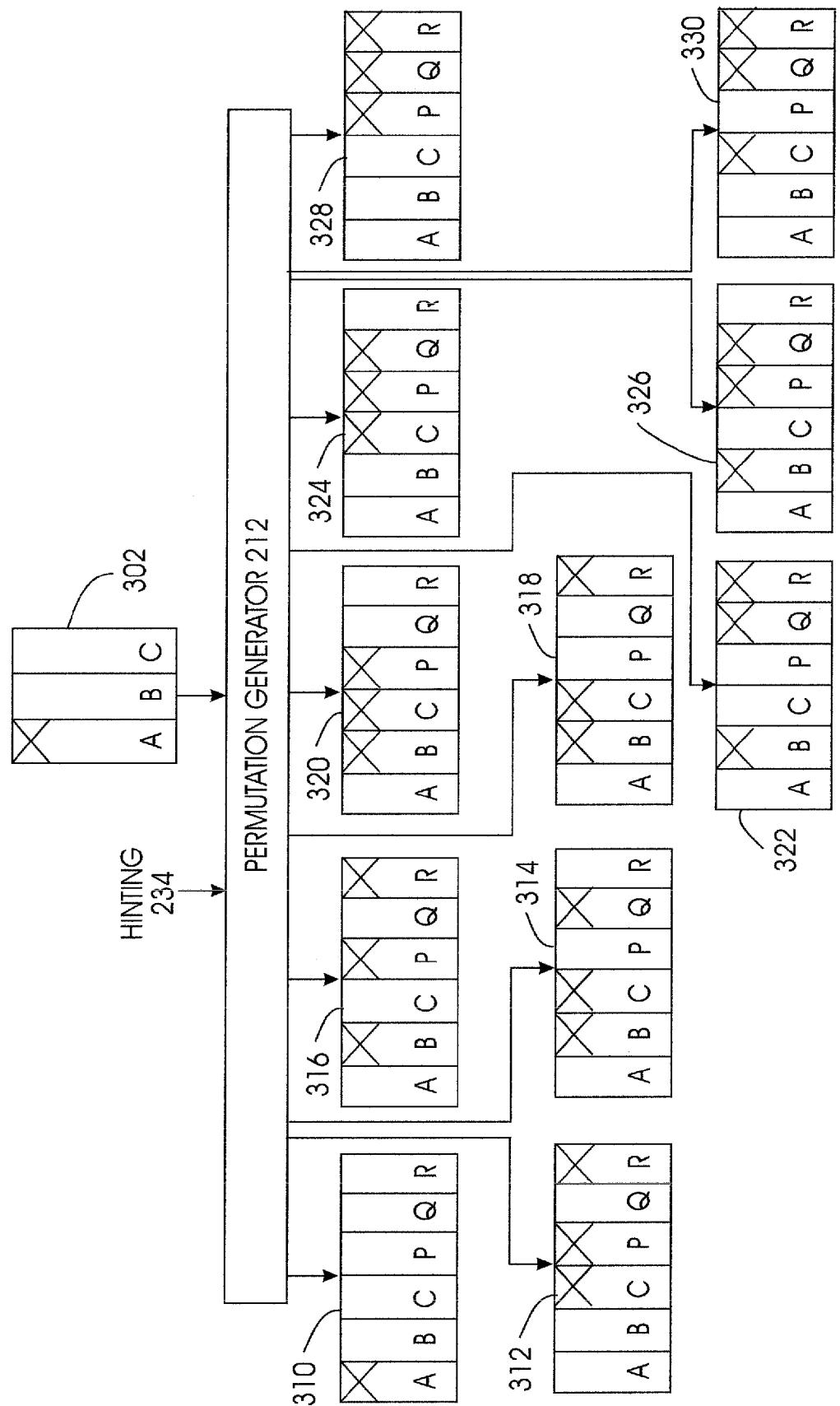
FIG. 3 depicts allowed permutations generated by a permutation generator, shown in FIG. 2, for an exemplary SOLD triple according to the subject matter disclosed herein.

FIG. 3 depicts allowed permutations generated by permutation generator 212 for an exemplary SOLD triple 302. SOLD triple 302 depicts a solitary read request on disk A and no read requests on disks B and C. Permutation generator 212, in the absence of any hinting information 234, produces all allowed permutations 310-330 over disks A, B, C, P, Q and R that satisfies SOLD triple 302. In particular, permutation 310 represents a single disk A read 310. Additionally, all combinations of three-disk reads of the six available disks A, B, C, P, Q and R for reconstructing the request on disk A are shown. More specifically, permutation 312 represents disk reads of disks C, P and R. Permutation 314 represents disk reads of disks B, C and Q. Permutation 316 represents disk reads of disks B, P and R. Permutation 318 represents disk reads of disks B, C and R. Permutation 320 represents disk reads of disks B, C and P. Permutation 322 represents disk reads of disks B, Q and R. Permutation 324 represents disk reads of disks C, P and Q. Permutation 326 represents disk reads of disks B, P and Q. Permutation 328 represents disk reads of disks P, Q and R. Lastly, permutation 330 represents disk reads of disks C, Q and R. Each request, 312-330, is able to reconstruct the SOLD requested 302 by way of the design of the parity calculation.

Hinting is used by permutation generator 212 for eliminating disk read combinations. For example, in a situation in which hinting provides information that disks C, P and Q are preferred because disks A and B are heavily loaded and disk R has failed, permutation generator 212 would only generate permutations 310 and 324. The process of hinting informs the permutation generator 212 which disks would be prohibitively expensive to use.

Figure 4:
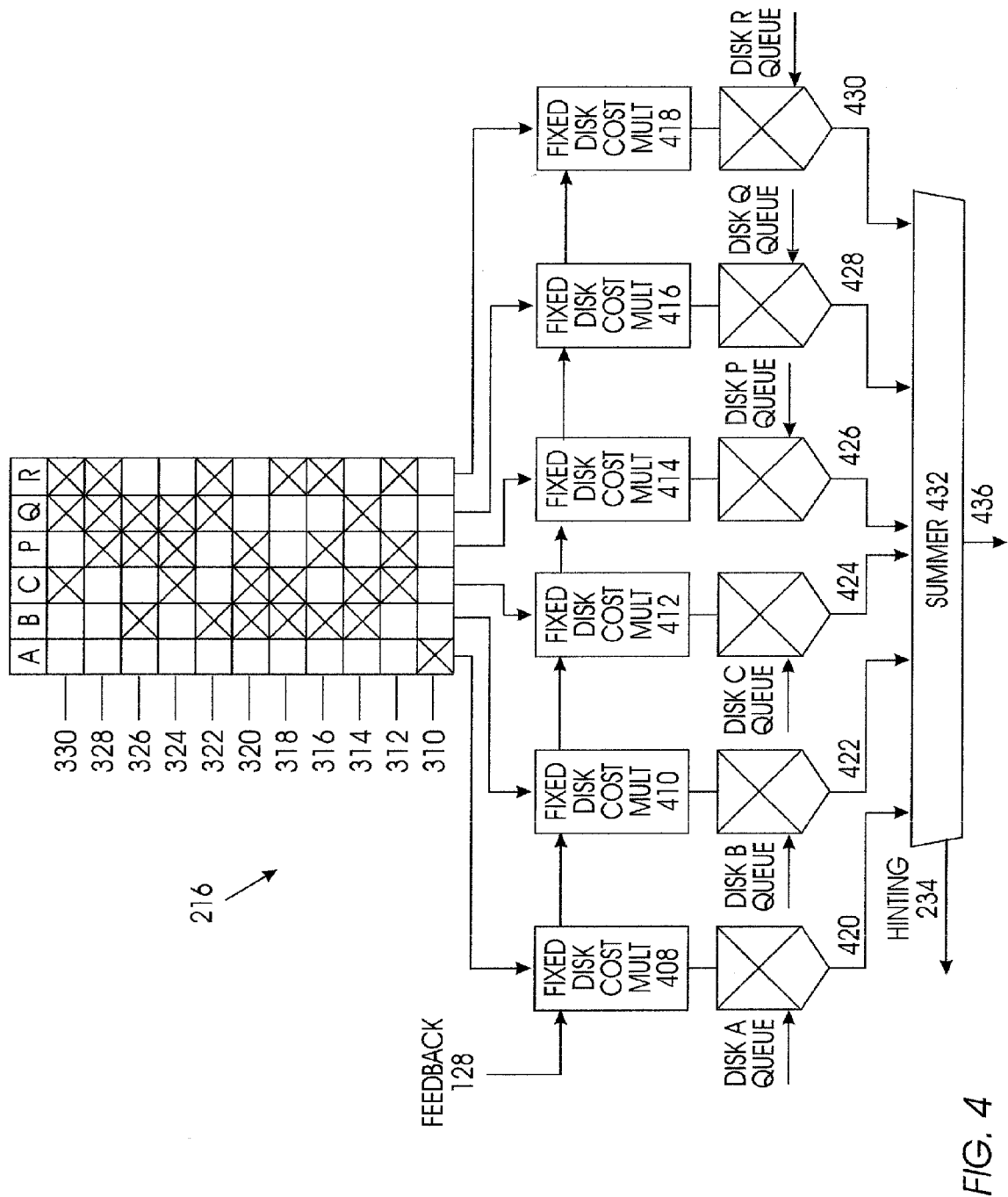
FIG. 4 is a functional block diagram showing greater detail of a cost calculator, shown in FIG. 2, according to the subject matter disclosed herein.

FIG. 4 is a functional block diagram showing greater detail of cost calculator 216, shown in FIG. 2. Cost calculator 216 includes fixed disk cost multipliers 408-418, weighting multipliers 420-430, and a cost summer 432. Permutations 310-330 are respectively input to fixed disk cost multipliers 408-418. The value of each respective fixed disk multiplier is adjusted based on the disk's measured performance through feedback 128. The output of each respective fixed disk multiplier is weighted by the length of each corresponding disk queue for disks A, B, C, P, Q and R through 232a-f. The result for each permutation is calculated by summer 432 and output as permutation expense 436. The summer 432 may add the input results, or may expense the largest input result, or may use another appropriate algorithm. If necessary, hinting information 234 is output to permutation generator 212 (FIGS. 2 and 3).

Figure 5:
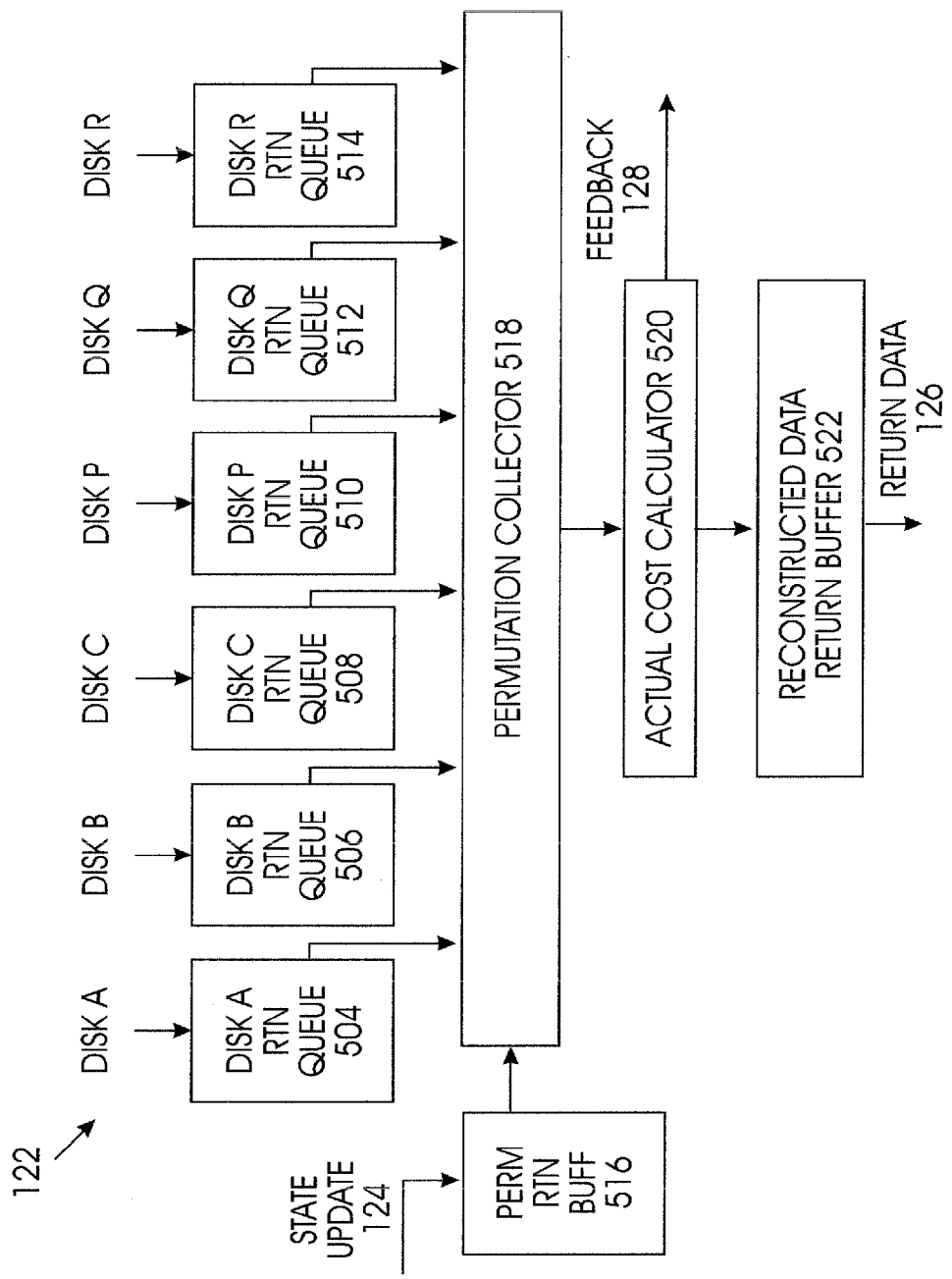
FIG. 5 is a functional block diagram showing greater detail of a combiner, shown in FIG. 1, according to the subject matter disclosed herein.

FIG. 5 is a functional block diagram showing greater detail of combiner 122, shown in FIG. 1. Combiner 122 includes disk return queues 504-514, a permutation return buffer 516, a permutation collector 518, an actual cost calculator 520 and a reconstructed data return buffer 522. Each disk A, B, C, P, Q and R respectively returns data to disk return queues 504-514, which operate in a well-known manner. The selected permutation for a SOLD triple is output from permutation multiplexer 218 to permutation return buffer 516 as state update information 124. Permutation collector 518 receives a completed permutation in disk return queues 504-514 and the selected permutation from permutation return buffer 516. The actual cost of the permutation is then calculated by actual cost calculator 520. Actual cost information is returned to cost calculator 216 as feedback information 128 (FIGS. 2 and 3). The data for the original SOLD is reconstructed by reconstructed data return buffer 522 and output as return data 126 (FIG. 1).

For example, consider the costing of the situation wherein which disks A and B are moderately loaded and disk R has failed; and in which the SOLD requests one sector from disk A. Further, the metric in this example uses a trivial estimate of the sum of queue times for retrieving the data as the cost. Assume that disk A queue 220 has a length of 40 outstanding requests, disk B queue 222 has a length of 35, disk C queue 224 has a length of 5, disk P queue 226 has a length of 8, disk Q queue 228 has a length of 7 and disk R queue 230 has an indeterminate length. These queue lengths are passed to the cost calculator 216 through pathways 232a-f. Cost calculator 216 knows that requests to identical disks A, B, C, P and Q take 10 ms to complete and these weights are stored in fixed disk cost multipliers 408-416. Disk R, having failed, is taking more than $10^6$ s to complete its requests 418. Hinting pathway 234 informs the permutation generator 212 that disk R has failed. Thus, when the SOLD request for disk A is received 302, the permutation generator 212 generates pathway permutations on disk A 310, disks BCQ 314, disks BCP 320, disks CPQ 324 and disks BPQ 326. The metric for pathway 310 is 40×10 ms+0+0+0+0+0=400 ms, and for pathway 314 the metric is 0+35×10 ms+5×10 ms+0+7×10 ms=470 ms.

Similarly, pathway 320 has a summed cost of 480 ms, pathway 324 has a cost of 200 ms and pathway 326 has a cost of 500 ms. Thus, the lowest cost path is pathway 324 issuing reads to disks C, P and Q. The chosen pathway is conveyed to combiner 122 through state update 124. Combiner 122 receives the relevant data from disks C, P and Q for reconstructing disk A's information in the permutation collector 518. The measured times to complete the request is collated in 520 and the results used to update cost calculator 216 through feedback 128. In this example, the metric is very simple and the working disks are identical in performance so feedback is not required. A more sophisticated cost calculator, however, may, for example, account for the fact that the time for a disk to complete a request is not linear in the queue length, as is assumed here. The feedback mechanism permits the cost calculator to use a more accurate estimate.

The subject matter disclosed herein can determine an optimal pathway for retrieving data from a data storage system as requests for data are received. Alternatively, the subject matter disclosed herein determines optimal pathways in advance, based on current operating conditions of the storage system, and selects a predetermined optimal pathway for each received data request. Moreover, the subject matter disclosed herein can be configured as a processing system within a storage system that executes machine-language instructions or as individual components contained within a storage system that perform the respective functions of the subject matter disclosed herein.

While the subject matter disclosed herein has been described with respect to a specific example illustrating a general process for selecting a best pathway to data and for improving performance of data reads of a storage system, those skilled in the art will appreciate that there are numerous variations and permutations of the above described systems and techniques that fall within the spirit and scope of the subject matter as set forth in the appended claims.

What is claimed is:

1. A method for determining a pathway for obtaining data stored in a data storage system comprising N storage devices and more than N pathways for retrieving requested data from the data storage system, the method comprising:
   receiving a read request from a requester;
   separating the read request into an appropriate segment and size for sending the storage devices of the data storage system;
   generating queue length information and estimated current cost information;
   generating a reduced number of read permutations based at least in part on the queue length information and the estimated current cost information, the read permutations being generated before the request has been received and the read permutations satisfying the received read request;
   calculating an expense of each permutation based at least in part on a predetermined metric and at least in part on performance information received from the storage devices of the storage system, the predetermined metric being periodically changed based at least in part on a change in operating conditions of the storage system;
   selecting a read permutation from possible read permutations satisfying the received read request;
   sending the selected read permutation to the storage devices of the storage system;
   receiving the requested data from the N storage devices in response to the selected read permutation being sent to the storage devices; and
   returning the satisfied read request to the requester.

* * * * *